United States Patent
Wang et al.

(10) Patent No.: US 12,192,443 B2
(45) Date of Patent: Jan. 7, 2025

(54) MERGE CANDIDATE LIST FOR GRADUAL DECODING REFRESH

(71) Applicant: NOKIA TECHNOLOGIES OY, Espoo (FI)

(72) Inventors: Limin Wang, San Diego, CA (US); Seungwook Hong, San Diego, CA (US); Krit Panusopone, San Diego, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 144 days.

(21) Appl. No.: 17/995,201

(22) PCT Filed: Mar. 18, 2021

(86) PCT No.: PCT/EP2021/056966
§ 371 (c)(1),
(2) Date: Sep. 30, 2022

(87) PCT Pub. No.: WO2021/197862
PCT Pub. Date: Oct. 7, 2021

(65) Prior Publication Data
US 2023/0146398 A1    May 11, 2023

Related U.S. Application Data

(60) Provisional application No. 63/002,919, filed on Mar. 31, 2020.

(51) Int. Cl.
*H04N 19/577* (2014.01)
*H04N 19/105* (2014.01)
(Continued)

(52) U.S. Cl.
CPC ......... *H04N 19/105* (2014.11); *H04N 19/154* (2014.11); *H04N 19/172* (2014.11)

(58) Field of Classification Search
CPC .. H04N 19/105; H04N 19/154; H04N 19/172; H04N 19/134; H04N 19/159;
(Continued)

(56) References Cited

U.S. PATENT DOCUMENTS

| 2013/0114735 A1* | 5/2013 | Wang .................. H04N 19/176 375/E7.231 |
| 2013/0229485 A1* | 9/2013 | Rusanovskyy ...... H04N 13/161 348/43 |

(Continued)

FOREIGN PATENT DOCUMENTS

WO    WO 2019/223746 A1    11/2019

OTHER PUBLICATIONS

Bross et al., "Versatile Video Coding (Draft 8)", Joint Video Experts Team (JVET) of ITU-T SG 16 WP 3 and ISO/IEC JTC 1/SC 29/WG 11, 17th Meeting, Document JVET-Q2001-v13, (Jan. 7-17, 2020), 508 pages.

(Continued)

*Primary Examiner* — Howard D Brown, Jr.
(74) *Attorney, Agent, or Firm* — ALSTON & BIRD LLP

(57) ABSTRACT

A method, apparatus, and computer program product provide for solving merge candidate list mismatches. In the context of a method, the method accesses a current coding unit of a picture. The method can also generate a merge candidate list comprising a plurality of coding unit representations in a predefined order. The method also determines whether a particular coding unit representation within the merge candidate list is representative of a coding unit within a dirty area of the picture and prevents the particular coding unit representation and one or more coding unit representations following the particular coding unit in the predefined order from being selected as a merge candidate for the current coding unit.

12 Claims, 11 Drawing Sheets

(51) Int. Cl.
*H04N 19/154* (2014.01)
*H04N 19/172* (2014.01)

(58) Field of Classification Search
CPC .. H04N 19/167; H04N 19/176; H04N 19/507; H04N 19/513; H04N 19/52
See application file for complete search history.

(56) References Cited

U.S. PATENT DOCUMENTS

| | | | |
|---|---|---|---|
| 2014/0376633 A1* | 12/2014 | Zhang | H04N 19/597 375/240.16 |
| 2017/0310991 A1* | 10/2017 | Yamamoto | H04N 19/44 |
| 2021/0321138 A1* | 10/2021 | Samuelsson | H04N 19/172 |
| 2021/0329303 A1* | 10/2021 | Deshpande | H04N 19/70 |
| 2021/0368207 A1* | 11/2021 | Li | H04N 19/172 |
| 2021/0385472 A1* | 12/2021 | Seregin | H04N 19/423 |
| 2021/0392364 A1* | 12/2021 | Chiang | H04N 19/513 |
| 2022/0408080 A1* | 12/2022 | Sánchez De LaFuente | H04N 19/107 |
| 2023/0085937 A1* | 3/2023 | Deshpande | H04N 19/70 |
| 2023/0146398 A1* | 5/2023 | Wang | H04N 19/167 375/240.02 |

OTHER PUBLICATIONS

International Search Report and Written Opinion for Patent Cooperation Treaty Application No. PCT/EP2021/056966 dated Jun. 7, 2021, 15 pages.

Wang et al., "AHG9: Gradual Decoding Refresh for VVC", Joint Video Experts Team (JVET) of ITU-T SG 16 WP 3 and ISO/IEC JTC 1/SC 29/WG 11, 17th Meeting, Document JVET-Q0527, (Jan. 7-17, 2020), 6 pages.

* cited by examiner

MERGE CANDIDATE LIST FOR GRADUAL DECODING REFRESH

CROSS-REFERENCE TO RELATED APPLICATIONS

This application is a national phase entry of International Application No. PCT/EP2021/056966, filed Mar. 18, 2021, which claims benefit of U.S. Provisional Application No. 63/002,919, filed Mar. 31, 2020, the contents of which are hereby incorporated by reference in their entirety.

TECHNOLOGICAL FIELD

An example embodiment relates generally to techniques in video coding, and, more particularly, to techniques for solving merge candidate list mismatches.

BACKGROUND

Versatile Video Coding (VVC) is an international video coding standard under development by the Joint Video Experts Team (JVET). VVC is anticipated to be the successor to the High Efficiency Video Coding (HEVC) standard. In VVC, numerous new coding tools are available for coding video, including a number of new and refined inter prediction coding tools, such as, but not limited to, Extended Merge Prediction, Merge Mode with Motion Vector Difference (MVD) (MMVD), Advanced Motion Vector Prediction (AMVP) Mode with Symmetric MVD Signalling, Affine Motion Compensated Prediction, Geometric Partitioning Mode (GPM), and Combined Inter and Intra Prediction (CIIP). These tools require usage of at least part of a merge candidate list.

An encoder and decoder are to construct the same merge candidate list. However, when using approaches such as Gradual Decoding Refresh (GDR), a decoder may not be able to correctly decode a merge candidate. In this regard, the merge candidate may be missing from the merge candidate list at the decoder, such that the merge candidate list at encoder and the merge candidate list at decoder differ, resulting in a mismatch.

BRIEF SUMMARY

In an embodiment, an apparatus is provided comprising at least one processor and at least one memory including computer program code, the at least one memory and the computer program code are configured to, with the at least one processor, cause the apparatus to access a current coding unit of a picture. The at least one memory and the computer program code are further configured to, with the at least one processor, cause the apparatus to generate a merge candidate list comprising a plurality of coding unit representations in a predefined order. The at least one memory and the computer program code are further configured to, with the at least one processor, cause the apparatus to determine whether a particular coding unit representation within the merge candidate list is representative of a coding unit within a dirty area of the picture. The at least one memory and the computer program code are further configured to, with the at least one processor, cause the apparatus to, in accordance with a determination that the particular coding unit representation within the merge candidate list is representative of a coding unit within a dirty area of the picture, prevent the particular coding unit representation and one or more coding unit representations following the particular coding unit in the predefined order from being selected as a merge candidate for the current coding unit. In some embodiments of the apparatus, the picture comprises a gradual decoding refresh picture.

In another embodiment, an apparatus is provided comprising means for accessing a current coding unit of a picture. The apparatus further comprises means for generating a merge candidate list comprising a plurality of coding unit representations in a predefined order. The apparatus further comprises means for determining whether a particular coding unit representation within the merge candidate list is representative of a coding unit within a dirty area of the picture. The apparatus further comprises means for, in accordance with a determination that the particular coding unit representation within the merge candidate list is representative of a coding unit within a dirty area of the picture, preventing the particular coding unit representation and one or more coding unit representations following the particular coding unit in the predefined order from being selected as a merge candidate for the current coding unit. In some embodiments of the apparatus, the picture comprises a gradual decoding refresh picture.

In another embodiment, a method is provided, the method comprising accessing a current coding unit of a picture. The method further comprises generating a merge candidate list comprising a plurality of coding unit representations in a predefined order. The method further comprises determining whether a particular coding unit representation within the merge candidate list is representative of a coding unit within a dirty area of the picture. The method further comprises, in accordance with a determination that the particular coding unit representation within the merge candidate list is representative of a coding unit within a dirty area of the picture, preventing the particular coding unit representation and one or more coding unit representations following the particular coding unit in the predefined order from being selected as a merge candidate for the current coding unit. In some embodiments of the method, the picture comprises a gradual decoding refresh picture.

In another embodiment, a computer program product is provided comprising a non-transitory computer readable storage medium having program code portions stored thereon, the program code portions configured, upon execution, to access a current coding unit of a picture. The program code portions are further configured, upon execution, to generate a merge candidate list comprising a plurality of coding unit representations in a predefined order. The program code portions are further configured, upon execution, to determine whether a particular coding unit representation within the merge candidate list is representative of a coding unit within a dirty area of the picture. The program code portions are further configured, upon execution, to, in accordance with a determination that the particular coding unit representation within the merge candidate list is representative of a coding unit within a dirty area of the picture, prevent the particular coding unit representation and one or more coding unit representations following the particular coding unit in the predefined order from being selected as a merge candidate for the current coding unit. In some embodiments of the computer program product, the picture comprises a gradual decoding refresh picture.

In another embodiment, an apparatus is provided comprising at least one processor and at least one memory including computer program code, the at least one memory and the computer program code configured to, with the at least one processor, cause the apparatus to access a current coding unit of a picture. The at least one memory and the computer program code are further configured to, with the at least one processor, cause the apparatus to analyze a plurality of coding units associated with the current coding unit to determine whether one or more coding units of the plurality of coding units are within a dirty area of the picture. The at least one memory and the computer program code are further configured to, with the at least one processor, cause the apparatus to, in accordance with a determination that one or more coding units of the plurality of coding units are within a dirty area of the picture, prevent the one or more coding units within the dirty area of the picture from being included in a merge candidate list. The at least one memory and the computer program code are further configured to, with the at least one processor, cause the apparatus to generate a merge candidate list comprising only one or more coding unit representations representative of one or more coding units not within the dirty area of the picture. In some embodiments of the apparatus, the picture comprises a gradual decoding refresh picture.

In another embodiment, an apparatus is provided comprising means for accessing a current coding unit of a picture. The apparatus further comprises means for analyzing a plurality of coding units associated with the current coding unit to determine whether one or more coding units of the plurality of coding units are within a dirty area of the picture. The apparatus further comprises means for, in accordance with a determination that one or more coding units of the plurality of coding units are within a dirty area of the picture, preventing the one or more coding units within the dirty area of the picture from being included in a merge candidate list. The apparatus further comprises means for generating a merge candidate list comprising only one or more coding unit representations representative of one or more coding units not within the dirty area of the picture. In some embodiments of the apparatus, the picture comprises a gradual decoding refresh picture.

In another embodiment, a method is provided, the method comprising accessing a current coding unit of a picture. The method further comprises analyzing a plurality of coding units associated with the current coding unit to determine whether one or more coding units of the plurality of coding units are within a dirty area of the picture. The method further comprises, in accordance with a determination that one or more coding units of the plurality of coding units are within a dirty area of the picture, preventing the one or more coding units within the dirty area of the picture from being included in a merge candidate list. The method further comprises generating a merge candidate list comprising only one or more coding unit representations representative of one or more coding units not within the dirty area of the picture. In some embodiments of the method, the picture comprises a gradual decoding refresh picture.

In another embodiment, a computer program product is provided comprising a non-transitory computer readable storage medium having program code portions stored thereon, the program code portions configured, upon execution, to access a current coding unit of a picture. The program code portions are further configured, upon execution, to analyze a plurality of coding units associated with the current coding unit to determine whether one or more coding units of the plurality of coding units are within a dirty area of the picture. The program code portions are further configured, upon execution, to, in accordance with a determination that one or more coding units of the plurality of coding units are within a dirty area of the picture, prevent the one or more coding units within the dirty area of the picture from being included in a merge candidate list. The program code portions are further configured, upon execution, to generate a merge candidate list comprising only one or more coding unit representations representative of one or more coding units not within the dirty area of the picture. In some embodiments of the computer program product, the picture comprises a gradual decoding refresh picture.

BRIEF DESCRIPTION OF THE DRAWINGS

Figure 1A:
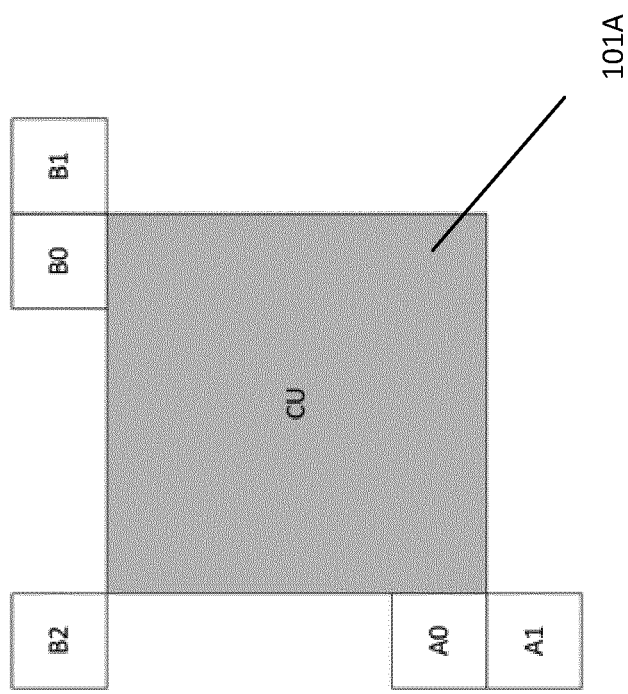
Figure 1B:
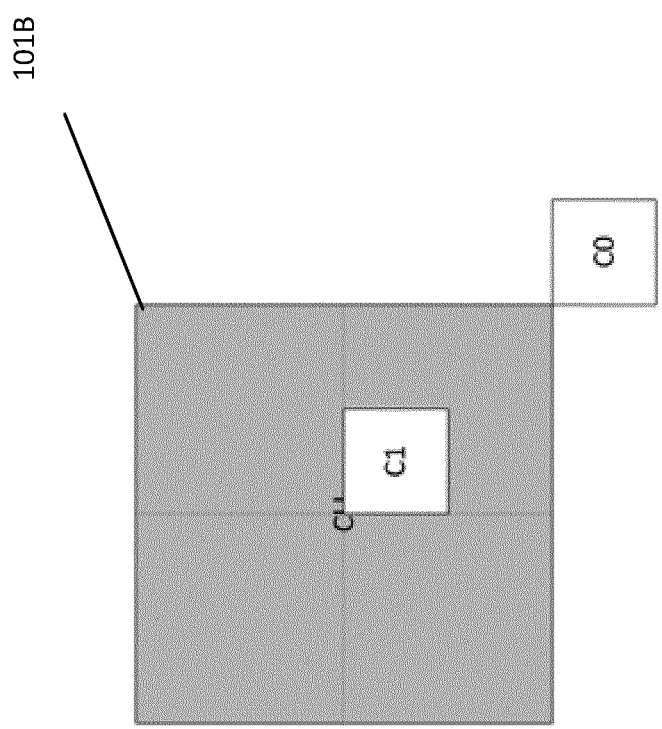
Figure 1C:
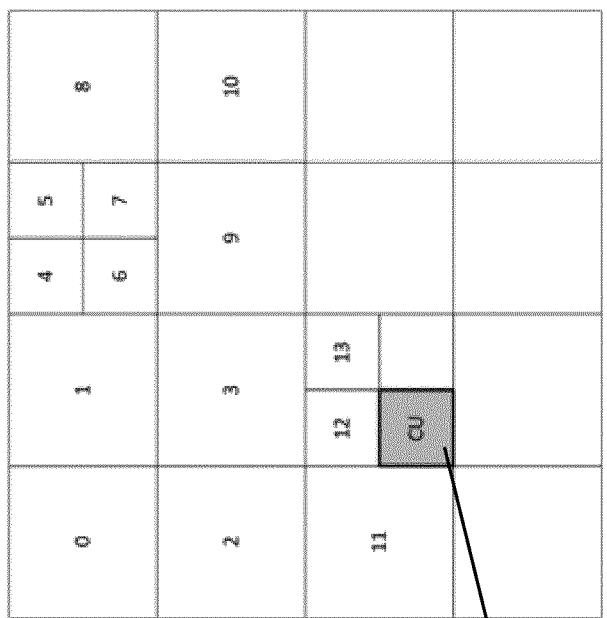
Figure 2:
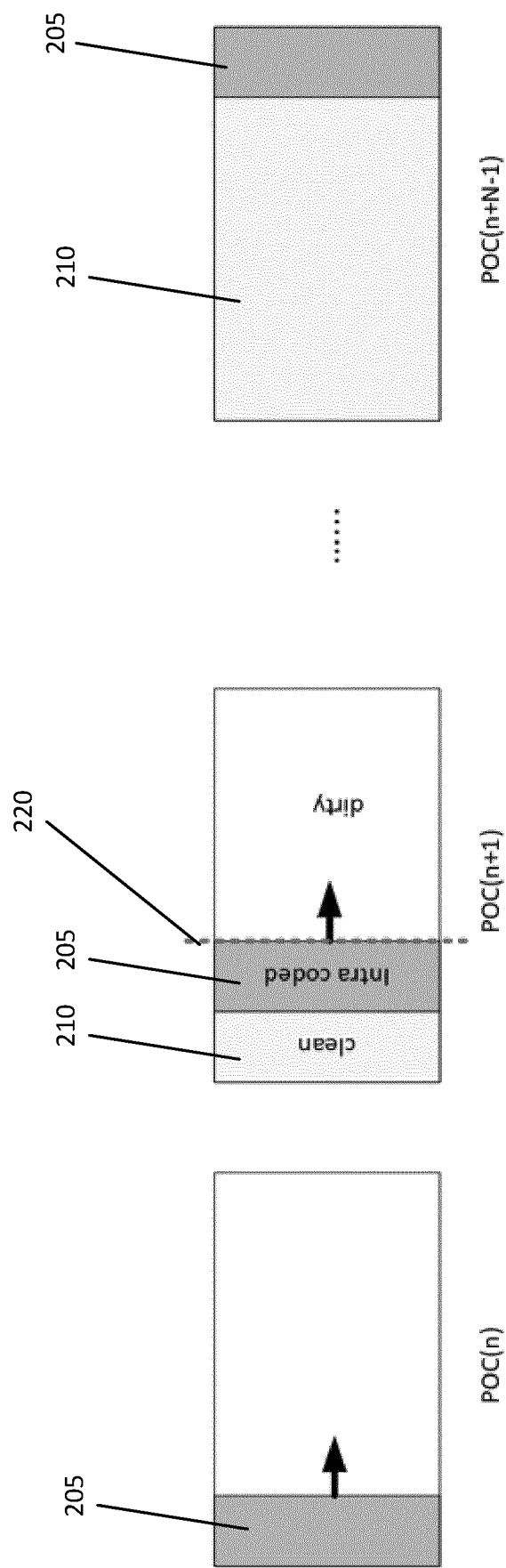
Figure 3:
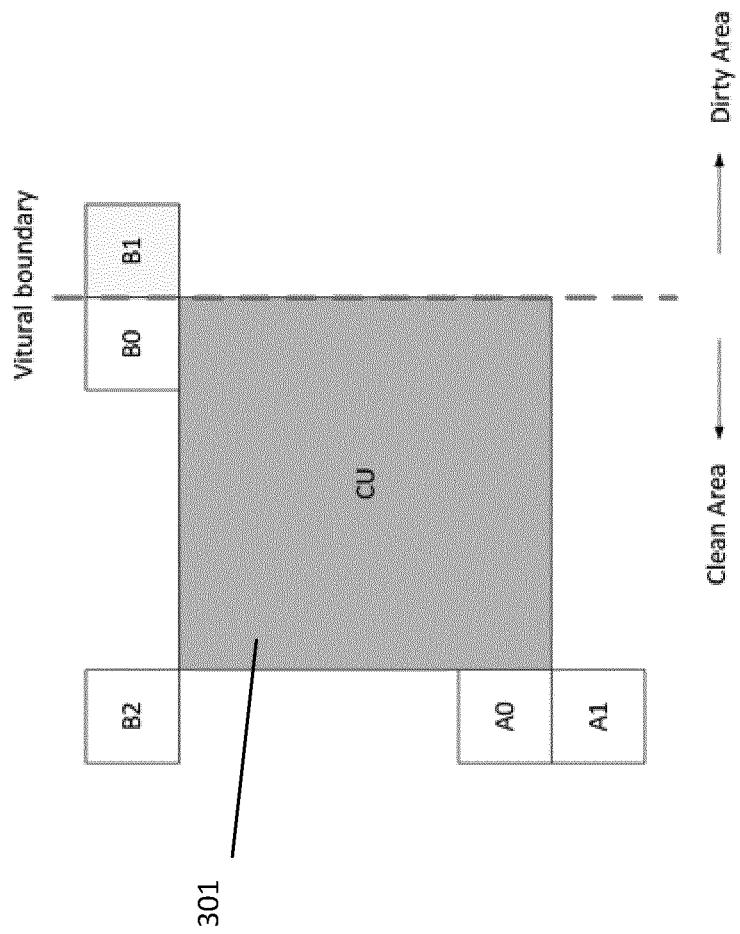
Figure 4:
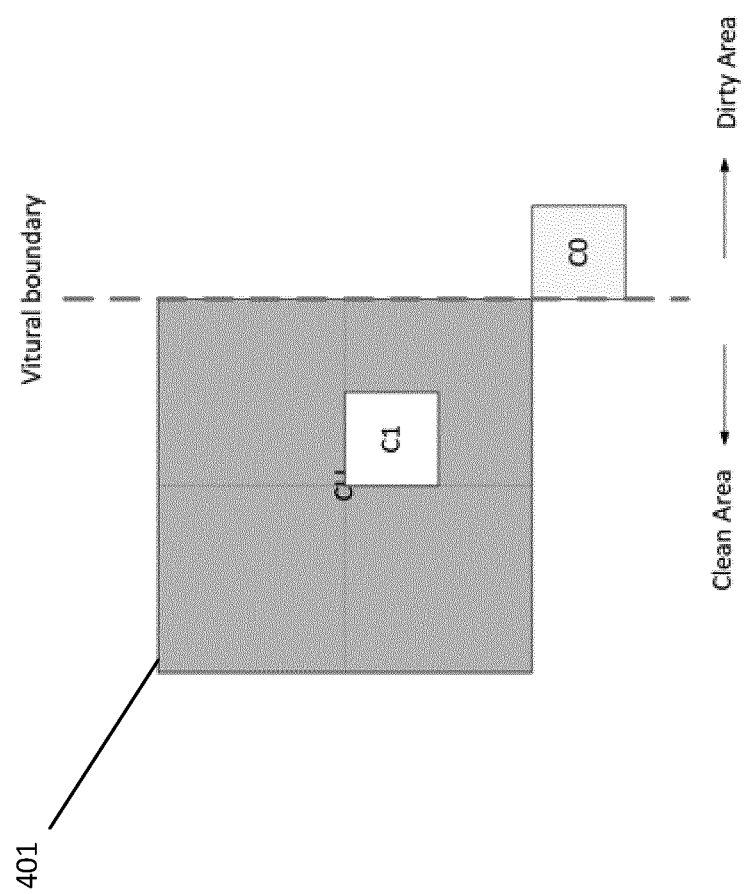
Figure 5:
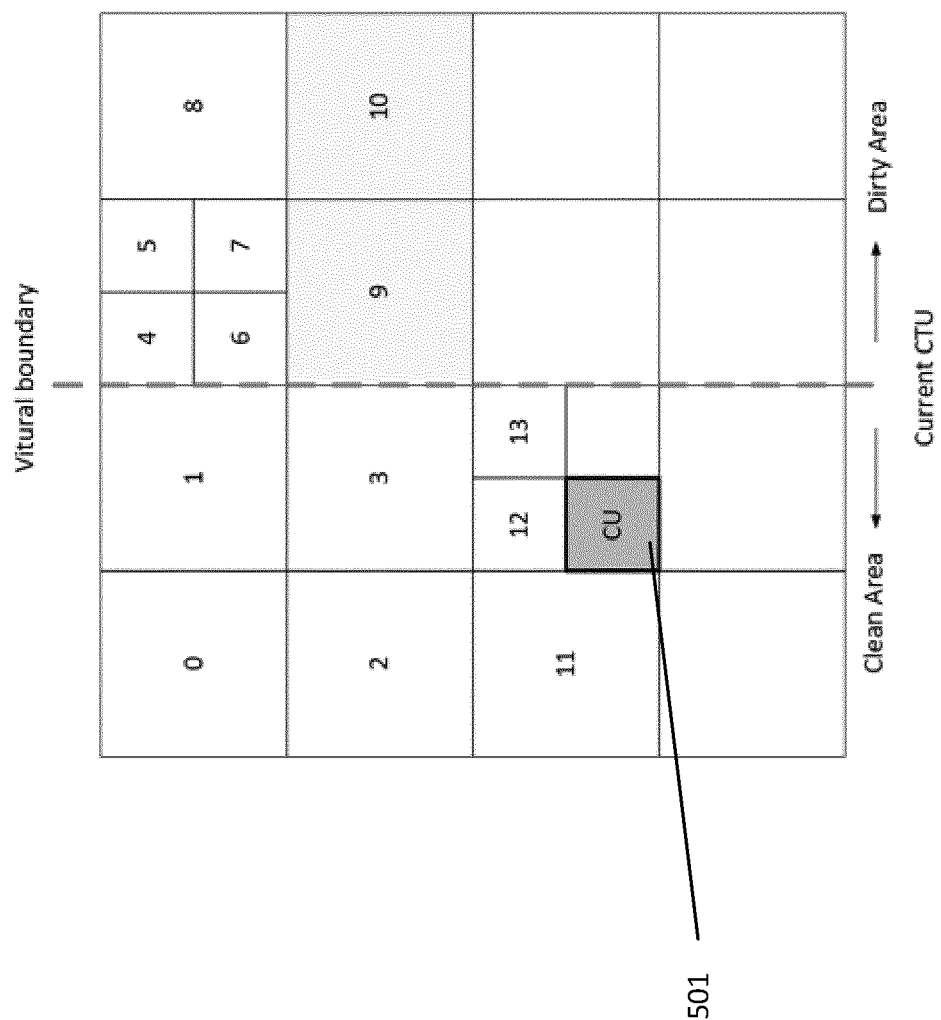
Figure 6:
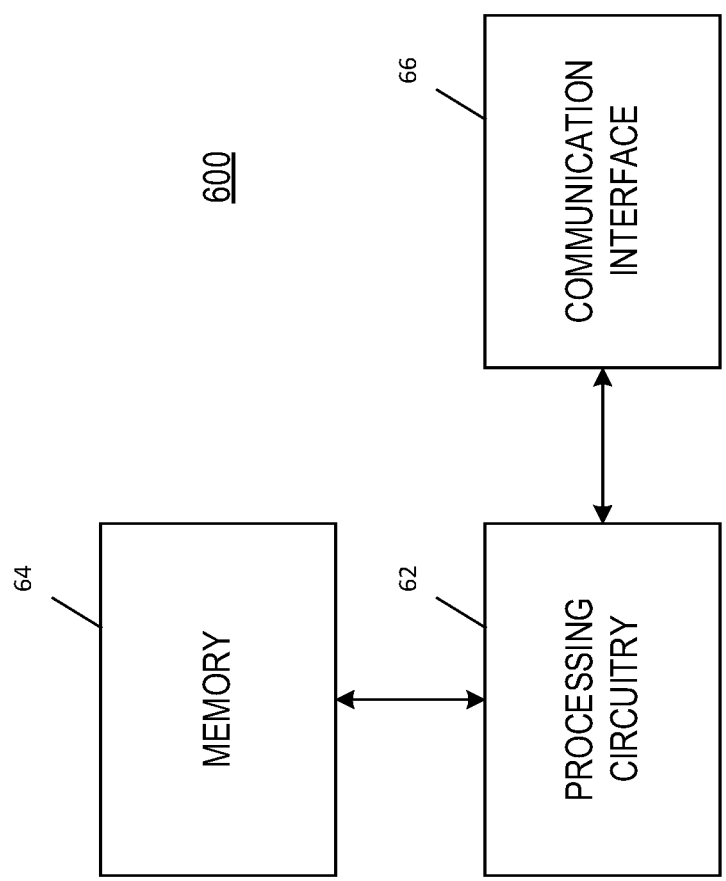
Figure 7A:
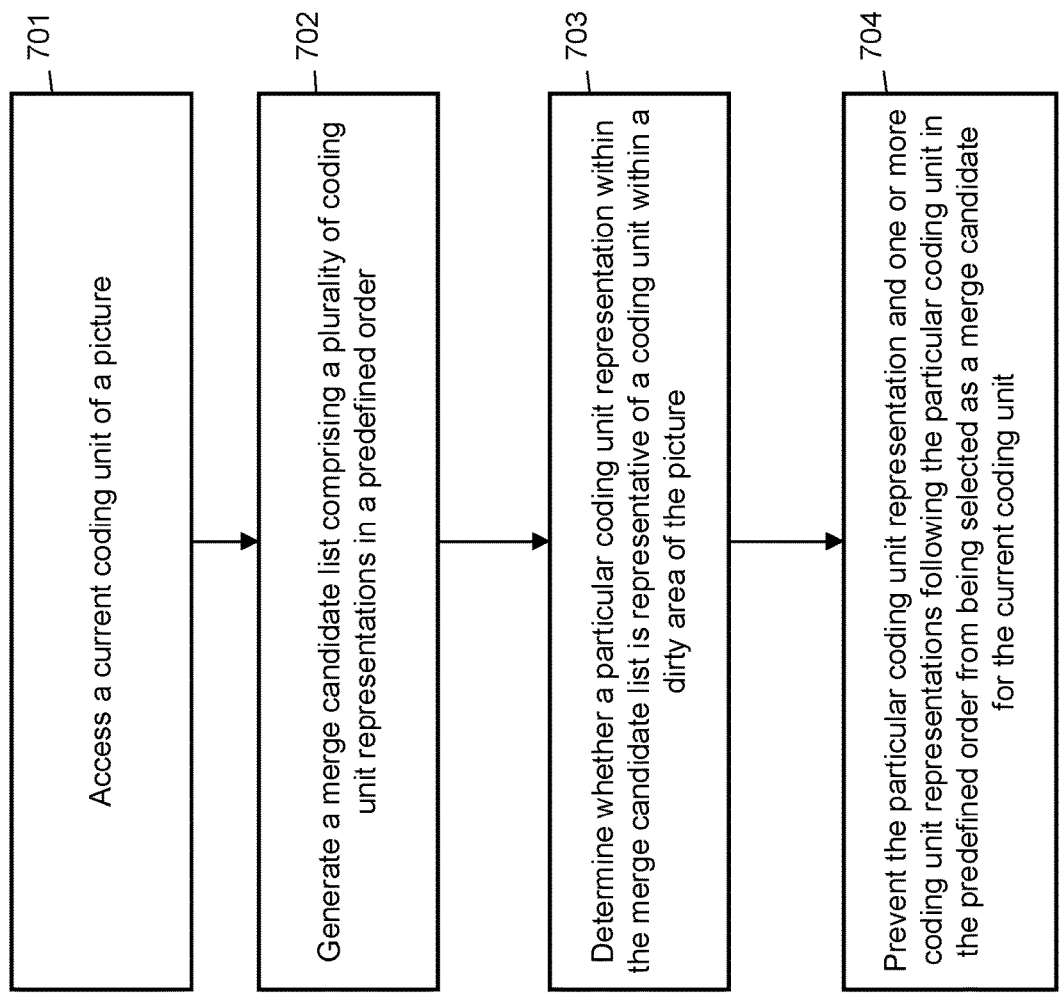
Figure 7B:
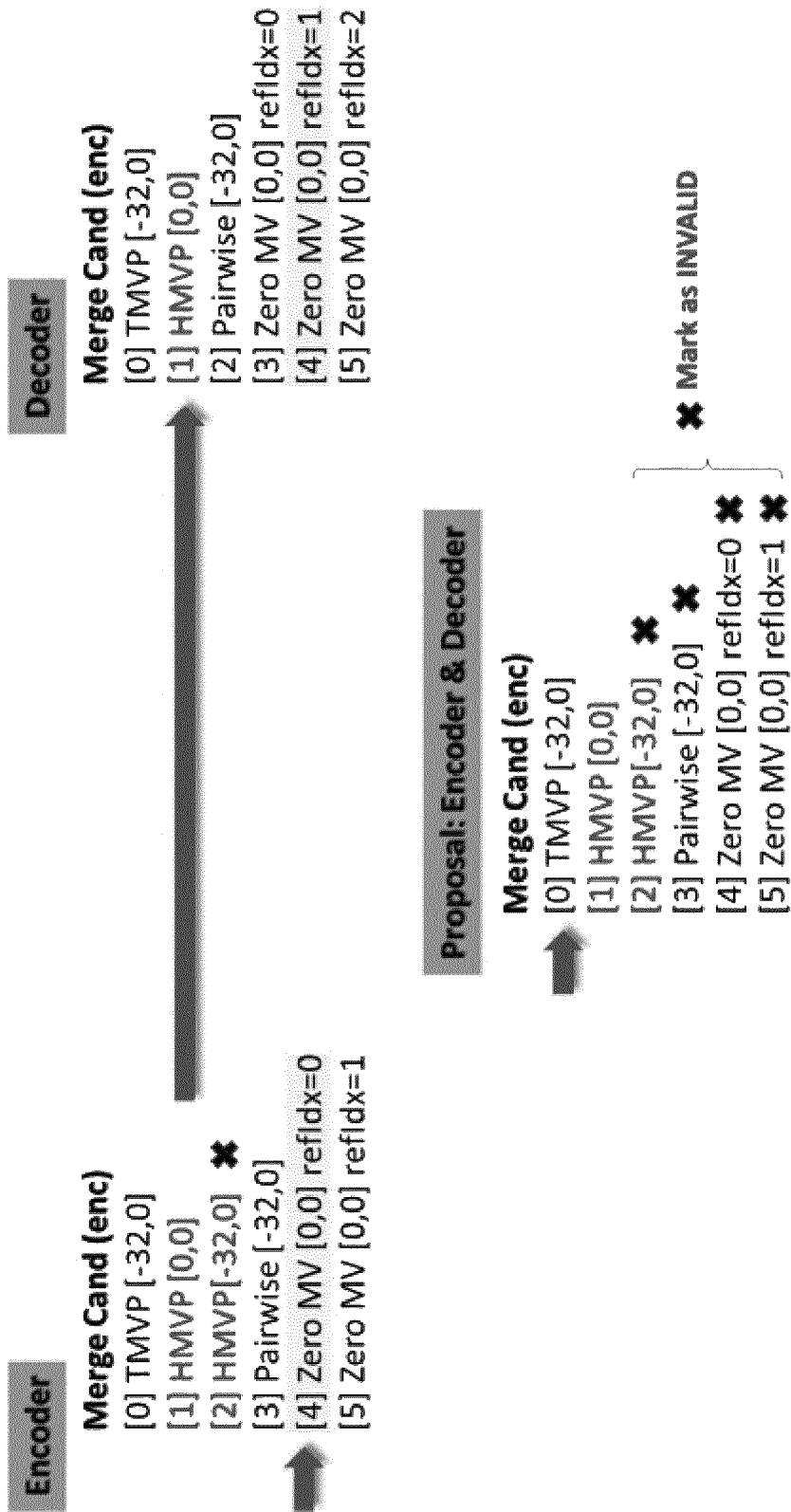
Figure 8:
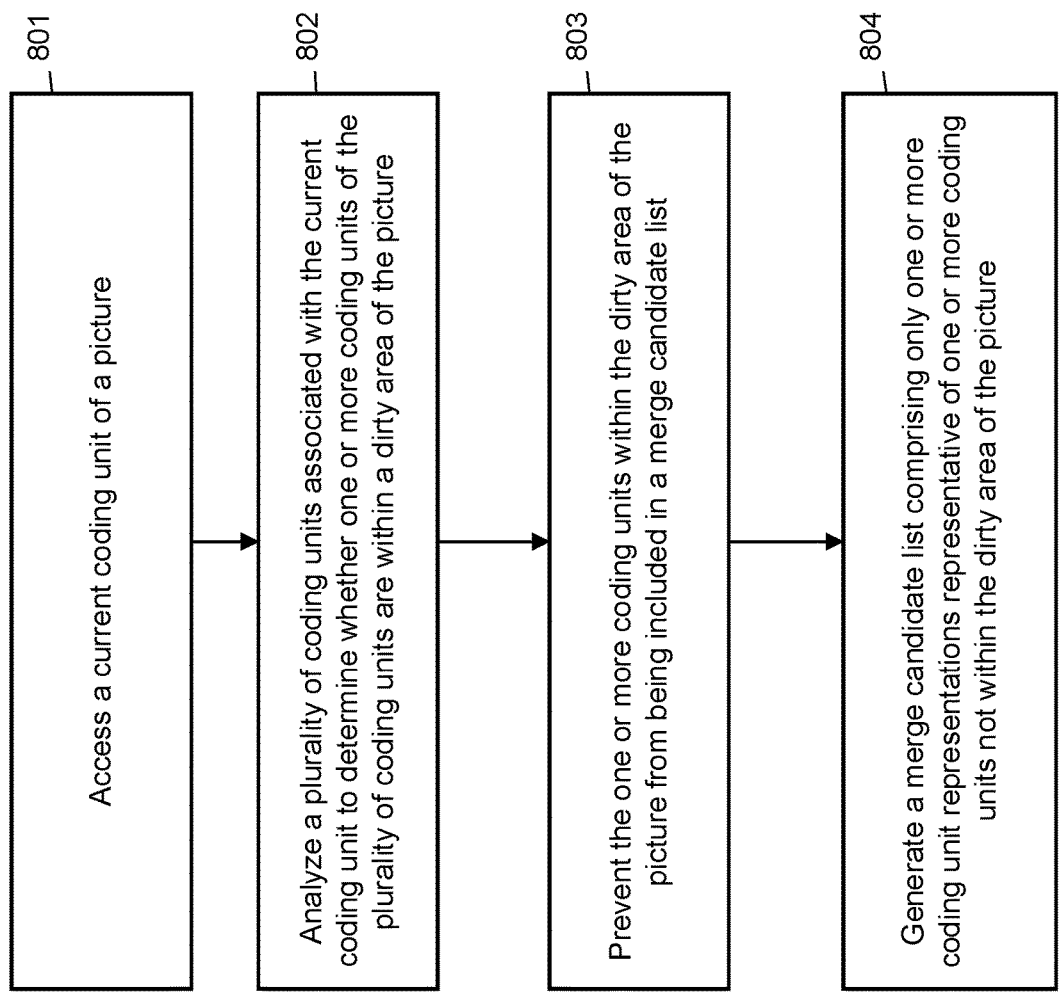

Having thus described certain example embodiments of the present disclosure in general terms, reference will hereinafter be made to the accompanying drawings, which are not necessarily drawn to scale, and wherein:

FIG. 1A is a representation of example spatial merge candidates for a current coding unit in accordance with an example embodiment;

FIG. 1B is a representation of example temporal merge candidates for a current coding unit in accordance with an example embodiment;

FIG. 1C is a representation of history-based motion vector prediction for a current coding unit in accordance with an example embodiment;

FIG. 2 is a representation of example GDR pictures wherein a clean area and a dirty area are separated by a virtual boundary in accordance with an example embodiment;

FIG. 3 a representation of an example spatial motion vector prediction in accordance with an example embodiment;

FIG. 4 a representation of an example temporal motion vector prediction in accordance with an example embodiment;

FIG. 5 a representation of an example history-based motion vector prediction in accordance with an example embodiment;

FIG. 6 is a block diagram of an apparatus that may be specifically configured in accordance with an example embodiment;

FIG. 7A is a flow diagram illustrating operations performed in accordance with an example embodiment;

FIG. 7B is a representation of merge candidate lists in accordance with an example embodiment; and FIG. 8 is a flow diagram illustrating operations performed in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Overview

In the Versatile Video Coding (VVC) Specification (B. Bross, J. Chen, S. Lin, and Y K. Wang, "Versatile Video Coding", JVET-Q2001-v13, January 2020, which is incorporated by reference herein, and hereinafter referred to as the "VVC Specification"), the merge candidate list for a current coding unit (CU) may be constructed to include five types of candidates in order of Spatial Motion Vector Prediction (MVP) from spatial neighboring CUs, Temporal Motion Vector Prediction (TMVP) from temporal collocated CUs, History-Based Motion Vector Prediction (HMVP), Pairwise Average MVP, and zero (0) motion vectors (MVs). The size of the merge candidate list is signaled in slice header and the maximum allowed size of the merge candidate list is six (6).

For Spatial MVP, the spatial merge candidates for a current CU are constructed from spatial neighboring CUs. For example, as shown in FIG. 1A, neighboring CUs that are spatial merge candidates for a current CU 101A include a left spatial neighboring CU A0, a bottom-left spatial neighboring CU A1, an above spatial neighboring CU B0, an above-right spatial neighboring CU B1, and an above-left spatial neighboring CU B2.

For Temporal MVP, the temporal merge candidate for a current CU is constructed from one of several collocated CUs in a collocated reference picture. For example, as shown in FIG. 1B, collocated CUs that may be temporal merge candidates for a current CU 101B include bottom-right collocated CU C0 and center collocated CU C1.

In HMVP, for a current CU, motion information of up to five (5) previously coded CUs are stored in a HMVP First In-First Out (FIFO) table and used as merge candidates. For example, as shown in FIG. 1C, for a current CU 101C, an HMVP table may comprise the motion information for previously coded CUs 9, 10, 11, 12, and 13.

For pairwise average MVP, pairwise average candidates may be generated by averaging predefined pairs of candidates in the existing merge candidate list. For example, a pairwise average candidate can be the average of candidate 0 and candidate 1 in the merge candidate list, that is, the average of candidate[0] and candidate[1]. After pairwise average merge candidates, the zero MVPs are inserted at the end, if necessary. Several examples of zero MVPs may include:

$MV(0,0)$ with refIdx=0

$MV(0,0)$ with refIdx=1

For a current CU, an encoder and a decoder are to construct the same merge candidate list. However, in some instances, such as instances in which Gradual Decoding Refresh (GDR) is utilized, a decoder may not be able to construct the same merge candidate list as the encoder. In this regard, a mismatch of merge candidate lists can occur.

FIG. 2 illustrates an example GDR picture with a vertical virtual boundary (e.g., a line defining a boundary between a clean area 205, 210 and a dirty area 215), where the forced intra coded area 205 (a part of clean area) moves left to right, and the clean area 205 and 210 expends gradually from the random access point of POC(n) to the recovery point of POC(N+n). A virtual boundary 220 separates the clean area 205, 210 and the dirty area 215 of the GDR picture. For example, a typical GDR picture consists of clean area (e.g., an area that has undergone an intra refresh) and dirty area (e.g., an area that has not yet undergone an intra refresh), wherein the clean area may contain a forced intra area next to dirty area for progressive intra refresh (PIR).

In GDR, the coding information (e.g., reconstructed pixels, coding mode, MVs, reference index (refIdx), etc.) in dirty areas (of current pictures and reference pictures) may not be reliable for CUs in a clean area, and that information could be missing or otherwise incorrect at the decoder. In other words, if an exact match at the recovery point is required, coding units (CU) in a clean area cannot use any coding information (e.g., reconstructed pixels, code mode, motion vectors (MVs), reference index (refIdx), etc.) from the dirty area.

In GDR, for a current CU in the clean area, some merge candidates in the merge candidate list may be within dirty area. These merge candidates may be included in the merge candidate list at the encoder, but not at the decoder, which results in a mismatch. FIGS. 3-5 described below provide examples of such cases.

FIG. 3 shows an example of Spatial MVP with a current CU 301 and neighboring CUs that are spatial merge candidates for the current CU 301 include a left spatial neighboring CU A0, a bottom-left spatial neighboring CU A1, an above spatial neighboring CU B0, an above-right spatial neighboring CU B1, and an above-left spatial neighboring CU B2. As shown, B1 is within dirty area of current picture, it thus may not be decoded correctly at the decoder and consequently may not appear in the merge candidate list at the decoder. However, the encoder may still include B1 as a merge candidate within its merge candidate list. The merge candidate lists at the encoder and decoder therefore differ, and result in a mismatch.

FIG. 4 shows an example of Temporal MVP. In this example, for a current CU 401 in the clean area, the encoder will construct a temporal merge candidate from one of two collocated CUs in the collocated reference picture, C0 or C1. Since C0 is within the dirty area of the collected reference picture, C0 may not be correctly decoded at the decoder and thus may not be included in the merge candidate list at the decoder. The merge candidate lists at the encoder and decoder are therefore different and result in a mismatch.

FIG. 5 shows an example of HMVP. In this example, for a current CU 501 in the clean area, the encoder will construct an HMVP table from motion information of up to five previously coded CUs, e.g., the HMVP table contains the motion information of CUs 9, 10, 11, 12, and 13. However, since CUs 9 and 10 are in the dirty area of the current picture, the motion information of CUs 9 and 10 may not be decoded correctly at the decoder and may not be included in the HMVP table at the decoder. When the entries of HMVP tables are included in the merge candidate lists, the encoder and decoder may have different merge candidates in their merge candidate lists, which will result in a mismatch.

Thus, for a current CU in the clean area, if a merge candidate in merge candidate list is associated with a CU in the dirty area (of current picture or reference pictures), a decoder may not be able to correctly decode the merge candidate. Consequently, the merge candidate may be missing from the merge candidate list at the decoder, or, in some cases, may appear in the merge candidate list at the decoder but with different motion information than the corresponding merge candidate at the encoder, and the merge candidate lists at the encoder and decoder may therefore mismatch.

One example of an apparatus 600 that may be configured to carry out operations in accordance with an embodiment described herein is depicted in FIG. 6. As shown in FIG. 6, the apparatus includes, is associated with or is in communication with processing circuity 62, a memory 64 and a communication interface 66. The processing circuitry 62 may be in communication with the memory via a bus for passing information among components of the apparatus. The memory may be non-transitory and may include, for example, one or more volatile and/or non-volatile memories. In other words, for example, the memory may be an electronic storage device (e.g., a computer readable storage medium) comprising gates configured to store data (e.g., bits) that may be retrievable by a machine (e.g., a computing device like the processing circuitry). The memory may be configured to store information, data, content, applications, instructions, or the like for enabling the apparatus to carry out various functions in accordance with an example embodiment of the present disclosure. For example, the memory could be configured to buffer input data for processing by the processing circuitry. Additionally, or alternatively, the memory could be configured to store instructions for execution by the processing circuitry.

The apparatus 600 may, in some embodiments, be embodied in various computing devices. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 62 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 62 may be configured to execute instructions stored in the memory 64 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 66 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

According to various embodiments, the apparatus 600 may be configured in accordance with an architecture for providing for video encoding, decoding, and/or compression. In this regard, the apparatus 600 may be configured as a video coding device. For example, the apparatus 600 may be configured to code video in accordance with one or more video compression standards, such as, for example, the VVC Specification. While an embodiment herein refers to operations associated with the VVC standard, it is to be appreciated that the processes discussed herein may be utilized for any video coding standard.

FIG. 7A shows a flowchart including operations of one embodiment in which a prevention technique is utilized for a merge candidate list. At operation 701, the apparatus 600 includes means, such as the processing circuitry 62, memory 64, and/or the like, configured to access a current coding unit of a picture. For example, the picture may be included as part of a coded video sequence, and the apparatus 600 may be configured to access the current coding unit of the picture during a coding process of the coded video sequence, such as during an encoding or decoding process. In some embodiments, the picture may be a gradual decoding refresh (GDR) picture.

At operation 702, the apparatus 600 includes means, such as the processing circuitry 62, memory 64, and/or the like, configured to generate a merge candidate list comprising a plurality of coding unit representations in a predefined order. At operation 703, the apparatus 600 includes means, such as the processing circuitry 62, memory 64, and/or the like, configured to determine whether a particular coding unit representation within the merge candidate list is representative of a coding unit within a dirty area of the picture.

In accordance with a determination that the particular coding unit representation within the merge candidate list is representative of a coding unit within a dirty area of the picture, at operation 704, the apparatus 600 includes means, such as the processing circuitry 62, memory 64, and/or the like, configured to prevent the particular coding unit representation and one or more coding unit representations following the particular coding unit in the predefined order from being selected as a merge candidate for the current coding unit.

In other words, for a current CU in a clean area, if a merge candidate on the merge candidate list is determined to be associated with a CU in a dirty area, the merge candidate and all other merge candidates following the merge candidate in merge candidate list are not selected or signalled. In this regard, an encoder and a decoder may still construct different merge candidate lists, but both the encoder and decoder would utilize only a first portion of the merger candidate lists comprising the same merge candidates in the same order (if any). Thus, no mismatch will occur.

These operations are further illustrated in FIG. 7B. As shown, a merge candidate list at the encoder includes "HMVP[−32,0]" as the third entry in the order. However, HMVP[−32,0] is associated with a CU in the dirty area. Conventionally, in this regard, the decoder may not decode the associated CU correctly, resulting in HMVP[−32,0] missing from the merge candidate list at the decoder. As such, if the encoder were to select "Zero MV(0,0) with refIdx=0" as the merge candidate and in turn signal merge index [4], the decoder would decode merge index [4] as merge candidate "Zero MV(0,0) with refIdx=1" resulting in a mismatch. However, the decoder can still correctly construct the merge candidates above HMVP[−32,0] in the merge candidate list. In other words, the merge candidates and their order above HMVP[−32,0] are still the same in the both merge candidate lists at the encoder and decoder.

Continuing with this example and as described above with respect to the operations of FIG. 7A, the encoder can classify merge candidate HMVP[−32,0] and all the other merge candidates following HMVP[−32,0] in the merge candidate list as invalid, preventing those merge candidates from being selected such that the encoder only selects a merge candidate among the merge candidates above HMVP[−32,0] in the merge candidate list. The first portion of merge candidates (e.g., above HMVP[−32,0]) and their order in the merge candidate list at the decoder are the same as in the merge candidate list at encoder. Thus, the decoder can correctly decode the merge candidate signaled by encoder, and there will be no mismatch.

FIG. 8 shows a flowchart including operations of another embodiment. At operation 801, the apparatus 600 includes means, such as the processing circuitry 62, memory 64, and/or the like, configured to access a current coding unit of a picture. For example, the picture may be included as part of a coded video sequence, and the apparatus 600 may be configured to access the current coding unit of the picture during a coding process of the coded video sequence, such as during an encoding or decoding process. In some embodiments, the picture may be a gradual decoding refresh (GDR) picture.

At operation 802, the apparatus 600 includes means, such as the processing circuitry 62, memory 64, and/or the like, configured to analyze a plurality of coding units associated with the current coding unit to determine whether one or more coding units of the plurality of coding units are within a dirty area of the picture. In accordance with a determination that one or more coding units of the plurality of coding units are within a dirty area of the picture, at operation 803, the apparatus 600 includes means, such as the processing circuitry 62, memory 64, and/or the like, configured to prevent the one or more coding units within the dirty area of the picture from being included in a merge candidate list.

At operation 804, the apparatus 600 includes means, such as the processing circuitry 62, memory 64, and/or the like, configured to generate a merge candidate list comprising only one or more coding unit representations representative of one or more coding units not within the dirty area of the picture.

In this regard, for a current CU in the clean area, one or more CUs in the dirty area (of current picture and reference pictures) are treated as unavailable, such that the associated coding information of the one or more CUs in the dirty area will not be included into the merge candidate lists at both the encoder and the decoder. In other words, both the encoder and decoder are enabled to construct the same merge candidate list, and thus, mismatches are prevented.

Using the Spatial MVP of FIG. 3 as an example, since CU B1 is within the dirty area of the picture, it will be treated as unavailable. Thus, it will not be included in the construction of spatial merge candidates in the merge candidate lists at both the encoder and decoder. The encoder and decoder will therefore have the same merge candidate list, and there will be no mismatch.

As another example, as seen in the Temporal MVP of FIG. 4, since CU C0 is within the dirty area of collocated reference picture, it is treated as unavailable, and C0 will not be included in the merge candidate lists at encoder and decoder. Encoder and decoder will therefore have the same merge candidate list, and there will be no mismatch.

As yet another example, referring back to the HMVP in FIG. 5, for a current CU 501 in the clean area, the last five (5) coded CUs are CUs 9, 10, 11, 12, and 13. Since CUs 9 and 10 are in the dirty area of the current picture, they are treated as unavailable. Hence, they will not be included in the HMVP table. Instead, motion information associated with CUs 2 and 3 may still remain in the HMVP (FIFO) table for the current CU, that is, the HMVP table would include CUs 2, 3, 11, 12, and 13. The encoder and decoder will therefore have the same merge candidate list, and there will be no mismatch for CUs in the clean area.

However, CUs in the dirty area can still use the HMVP table with motion information of up to five (5) previously coded CUs, as specified by the VVC Specification. For example, in FIG. 5, CU 8 is within the dirty area, and the HMVP table for CU 8 may include the motion information of five previously coded CUs 3, 4, 5, 6, and 7, where CU 3 is in the clean area and CUs 4, 5, 6 and 7 are in dirty area.

In the case of GDR, two HMVP tables may be constructed, with one HMVP table for CUs within the clean area and the other HMVP table for CUs within the dirty area. In this regard, the encoder and decoder are able to construct the same HMVP table for CUs within the clean area and the same HMVP table for CUs within the dirty area.

In some embodiments, when constructing the merge candidate list from HMVP for CUs in the clean area, the encoder and decoder use the HMVP table for CUs in the clean area. Similarly, when constructing the merge candidate list from HMVP for CUs in the dirty area, the encoder and decoder shall use the HMV table for CUs in dirty area. Both encoder and decoder should have the same merge candidate list, and hence, there will be no mismatch.

As described above, a method, apparatus, and computer program product are disclosed for facilitating merge candidate list functionality in accordance with Gradual Decoding Refresh (GDR) pictures and providing solutions to merge candidate list mismatches in GDR. The operations and principles described herein with respect to merge candidate list may be extended to other motion vector predictor candidate lists, such as, but not limited to, MVP candidate list for AMVP, Affine Motion Compensated Prediction, and the like.

FIGS. 7A and 8 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present invention and executed by a processor 32. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising: at least one processor; and at least one memory including computer program code, the at least one memory and the computer program code configured to, with the at least one processor, cause the apparatus to:
   determine whether a picture comprises a gradual decoding refresh picture; and
   in an instance in which the picture comprises a gradual decoding refresh picture:
   access a current coding unit of a picture;
   generate a merge candidate list comprising a plurality of coding unit representations in a predefined order;
   determine whether a particular coding unit representation within the merge candidate list is representative of a coding unit within a dirty area of the picture; and
   in accordance with a determination that the particular coding unit representation within the merge candidate list is representative of a coding unit within a dirty area of the picture:
   prevent the particular coding unit representation and one or more coding unit representations following the particular coding unit in the predefined order from being selected as a merge candidate for the current coding unit.

2. A method comprising:
   determine whether a picture comprises a gradual decoding refresh picture; and
   in an instance in which the picture comprises a gradual decoding refresh picture:
   accessing a current coding unit of a picture;
   generating a merge candidate list comprising a plurality of coding unit representations in a predefined order;
   determining whether a particular coding unit representation within the merge candidate list is representative of a coding unit within a dirty area of the picture; and
   in accordance with a determination that the particular coding unit representation within the merge candidate list is representative of a coding unit within a dirty area of the picture:
   preventing the particular coding unit representation and one or more coding unit representations following the particular coding unit in the predefined order from being selected as a merge candidate for the current coding unit.

3. A computer program product comprising a non-transitory computer readable storage medium having program code portions stored thereon, the program code portions configured, upon execution, to:
   determine whether a picture comprises a gradual decoding refresh picture; and in an instance in which the picture comprises a gradual decoding refresh picture:
access a current coding unit of a picture;
generate a merge candidate list comprising a plurality of coding unit representations in a predefined order;
determine whether a particular coding unit representation within the merge candidate list is representative of a coding unit within a dirty area of the picture; and
in accordance with a determination that the particular coding unit representation within the merge candidate list is representative of a coding unit within a dirty area of the picture:
prevent the particular coding unit representation and one or more coding unit representations following the particular coding unit in the predefined order from being selected as a merge candidate for the current coding unit.

4. An apparatus comprising: at least one processor; and at least one memory including computer program code, the at least one memory and the computer program code configured to, with the at least one processor, cause the apparatus to:
determine whether a picture comprises a gradual decoding refresh picture; and
in an instance in which the picture comprises a gradual decoding refresh picture:
access a current coding unit of a picture;
analyze a plurality of coding units associated with the current coding unit to determine whether one or more coding units of the plurality of coding units are within a dirty area of the picture;
in accordance with a determination that one or more coding units of the plurality of coding units are within a dirty area of the picture, prevent the one or more coding units within the dirty area of the picture from being included in a merge candidate list; and
generate a merge candidate list comprising only one or more coding unit representations representative of one or more coding units not within the dirty area of the picture.

5. A method comprising:
determine whether a picture comprises a gradual decoding refresh picture; and
in an instance in which the picture comprises a gradual decoding refresh picture:
accessing a current coding unit of a picture;
analyzing a plurality of coding units associated with the current coding unit to determine whether one or more coding units of the plurality of coding units are within a dirty area of the picture;
in accordance with a determination that one or more coding units of the plurality of coding units are within a dirty area of the picture, preventing the one or more coding units within the dirty area of the picture from being included in a merge candidate list; and
generating a merge candidate list comprising only one or more coding unit representations representative of one or more coding units not within the dirty area of the picture.

6. A computer program product comprising a non-transitory computer readable storage medium having program code portions stored thereon, the program code portions configured, upon execution, to:

determine whether a picture comprises a gradual decoding refresh picture; and
in an instance in which the picture comprises a gradual decoding refresh picture:
access a current coding unit of a picture;
analyze a plurality of coding units associated with the current coding unit to determine whether one or more coding units of the plurality of coding units are within a dirty area of the picture;
in accordance with a determination that one or more coding units of the plurality of coding units are within a dirty area of the picture, prevent the one or more coding units within the dirty area of the picture from being included in a merge candidate list; and
generate a merge candidate list comprising only one or more coding unit representations representative of one or more coding units not within the dirty area of the picture.

7. An apparatus according to claim 1 wherein the apparatus is caused to prevent the particular coding unit representation and one or more coding unit representations following the particular coding unit in the predefined order from being selected as a merge candidate for the current coding unit by not signaling the particular coding unit representation and one or more coding unit representations following the particular coding unit in the predefined order.

8. A method according to claim 2 wherein preventing the particular coding unit representation and one or more coding unit representations following the particular coding unit in the predefined order from being selected as a merge candidate for the current coding unit comprises preventing signaling of the particular coding unit representation and one or more coding unit representations following the particular coding unit in the predefined order.

9. A computer program product according to claim 3 wherein the program code portions configured to prevent the particular coding unit representation and one or more coding unit representations following the particular coding unit in the predefined order from being selected as a merge candidate for the current coding unit comprise program code portions configured to prevent signaling of the particular coding unit representation and one or more coding unit representations following the particular coding unit in the predefined order.

10. An apparatus according to claim 4 wherein the apparatus is caused to prevent the one or more coding units within the dirty area of the picture from being included in a merge candidate list by treating the one or more coding units within the dirty area of the picture as being unavailable.

11. A method according to claim 5 wherein preventing the one or more coding units within the dirty area of the picture from being included in a merge candidate list comprises treating the one or more coding units within the dirty area of the picture as being unavailable.

12. A computer program product according to claim 6 wherein the program code portions configured to prevent the one or more coding units within the dirty area of the picture from being included in a merge candidate list comprise program code portions configured to treat the one or more coding units within the dirty area of the picture as being unavailable.

* * * * *